Sept. 1, 1959     O. B. SHERMAN ET AL     2,901,769
APPARATUS FOR MAKING PLASTIC ARTICLES Filed April 12, 1955     3 Sheets-Sheet 1

INVENTORS
ORVILLE B. SHERMAN
LEONARD D. SOUBIER
BY
ATTORNEYS

Sept. 1, 1959     O. B. SHERMAN ET AL     2,901,769
APPARATUS FOR MAKING PLASTIC ARTICLES
Filed April 12, 1955     3 Sheets-Sheet 2
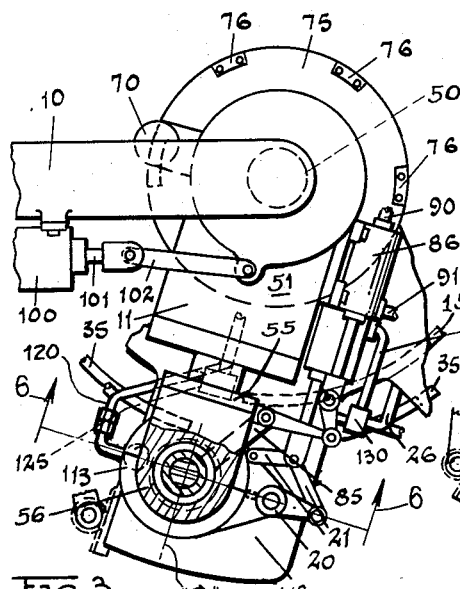
Fig 3
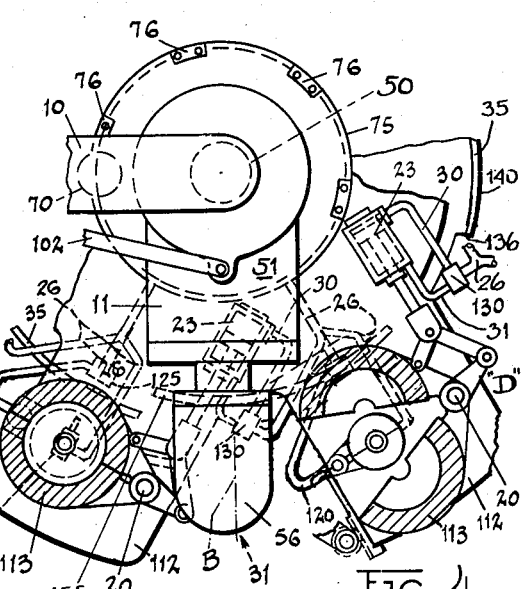
Fig 4
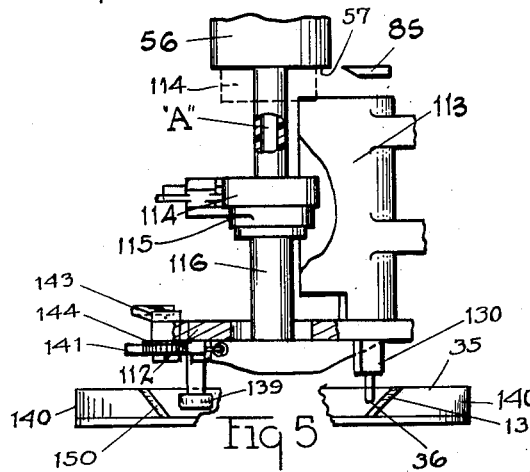
Fig 5
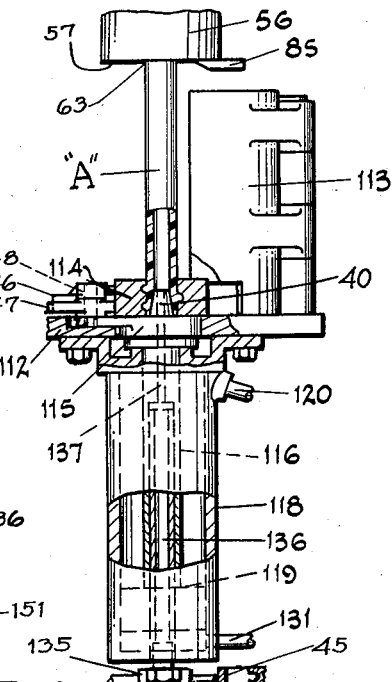
Fig 6
Fig 11
INVENTORS
ORVILLE B. SHERMAN
LEONARD D. SOUBIER
BY
ATTORNEYS Sept. 1, 1959   O. B. SHERMAN ET AL   2,901,769
APPARATUS FOR MAKING PLASTIC ARTICLES
Filed April 12, 1955   3 Sheets-Sheet 3

INVENTORS
ORVILLE B. SHERMAN
LEONARD D. SOUBIER
BY
ATTORNEYS

2,901,769
Patented Sept. 1, 1959

2,901,769

APPARATUS FOR MAKING PLASTIC ARTICLES

Orville B. Sherman and Leonard D. Soubier, Toledo, Ohio, assignors to Owens-Illinois Glass Company, a corporation of Ohio Application April 12, 1955, Serial No. 500,854

3 Claims. (Cl. 18—5)

This invention relates to the production of plastic articles formed from extruded moldable plastic material, and in particular to the rapid, continuous and automatic production thereof.

Essentially, the invention comprises the extrusion of organic plastic material in tubular form and in moldable condition together with the severing of moldable lengths therefrom to be expanded into finished articles. In addition the extrusion is made from an extrusion head which is adapted to be coordinated and movable in succession with a series of forming molds arranged for continuous movement in a closed path.

A further object is the continuous and uninterrupted production of plastic molded articles in seriatim by and through the use of a series of forming molds adapted for continuous rotation and adapted to receive in succession extruded lengths of tubular formations to be blown to hollow form.

Another object is the injection molding of a portion of an article, with the concurrent extrusion of a tubular length integral therewith and while the extrusion head and the cooperating molds are moving in unison.

Other objects will be apparent from the following descriptive matter.

In the drawings:

Fig. 3 is a plan view showing the extrusion head and a mold when in cooperative relation;

Fig. 4 is a further plan view showing the extrusion head between the successive mold cooperating positions;

Fig. 5 is an enlarged elevational view showing the injection mold and the extruding tube moving in cooperative alignment;

Fig. 6 is an enlarged view showing the completion of the tubular extrusion and just prior to the severing thereof;

Fig. 11 is a plan view of the neck mold mechanism.

Figure 1:
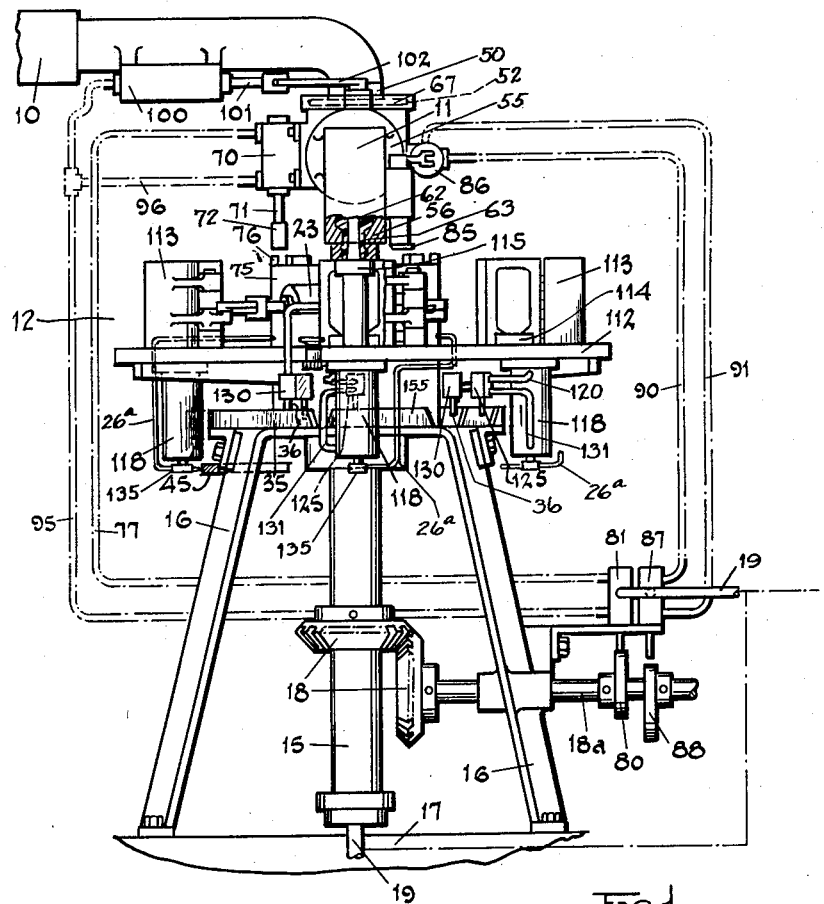
Fig. 1 is an elevational view of the molding machine and extruding device.
Figure 2:
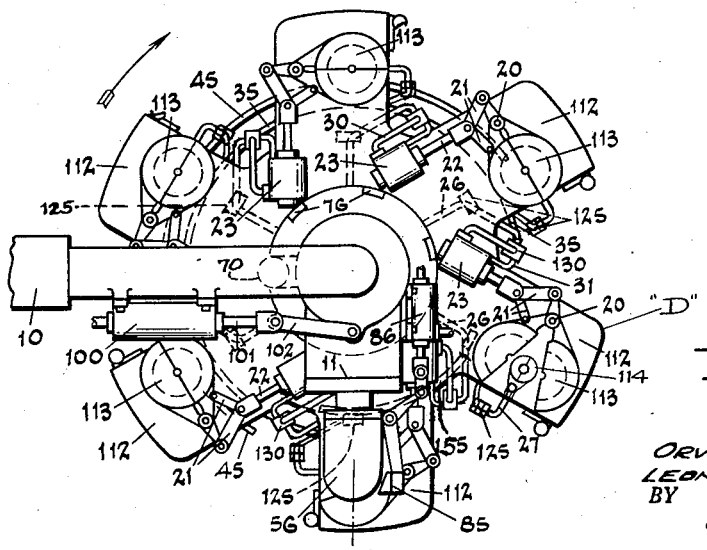
Fig. 2 is a plan view showing the relationship between the extrusion head and the molds of the molding machine.

Referring to the drawings, and in particular to Figs. 1 and 2, there is shown an extruder 10 having a movable head 11 mounted above a circular type molding machine 12 and adapted to cooperate in succession with an annular series of sectional blowing molds 113.

The forming machine 12 consists of a horizontal table 112 supported by a vertical column 15 mounted on legs 16 attached to a base 17. The series of molds 113 are equally spaced circumferentially about the vertical column 15 of the machine, and the table 112 is adapted to be rotated continuously through a train of gears 18 driven through the drive shaft 18ᵃ and through a motor drive not shown. Thus, the molds 113 will move continuously in a closed path. The vertical column 15 is hollow and carries air under pressure which is supplied thereto from any usual source through a main supply line 19.

Each mold unit consists of an inverted neck mold 114, a neck pin 40 and an inverted blowing mold 113. The blow mold 113 is made in partible halves, hinged about mold posts 20 and having operating link connections 21 to the piston 22 of an operating air motor 23. The neck mold 114 is also made in partible halves and these are mounted on the holder or head 115.

Figure 8:
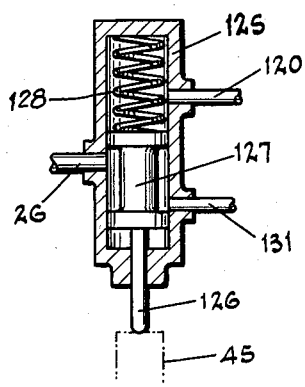
Fig. 8 is an enlarged sectional view showing the internal structure of the control valves.
Figure 9:
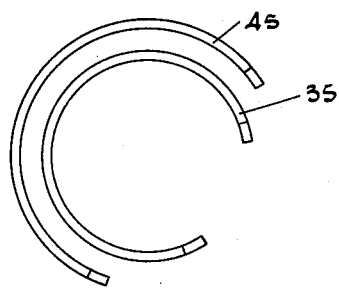
Fig. 9 is a plan view of the air control cams.
Figure 10:
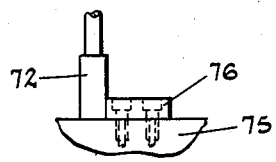
Fig. 10 is a detail view of the releasable connection between the extrusion head and the molding machine.

For operating the air motor 23, to open and close the molds 113, an air distributing valve 130 having the structure shown in Fig. 8, is mounted on table 112, and is supplied air pressure through main line 26 leading from the hollow column 15. In one position the valve provides air to motor 23 through line 30 to close the molds 113, and in its other position provides air to the opposite end of motor 23 through line 31 to open the molds. Valve 130 is actuated by the stationary circular cam 35 during rotation of table 112 and has contact therewith through its piston 36.

When the piston 36 of the air valve 130 is riding along the cam 35, the mold 113 will be held closed around the tubular length "A" of plastic molding material. When the piston 36 leaves the cam 35, the valve 130 will be shifted and the molds 113 will open.

Referring again to Fig. 1, the continuously rotating mold table 112 is provided with a series of sectional blowing molds 113 each of which is adapted to function with its individual neck mold 114 at given times in the forming cycle. Each neck mold 114 is mounted upon a piston rod head 115 which in turn is attached to the piston rod 116 of the air motor 118. The neck molds 114 may be either of the strip mold type or of the split partible type as shown in Fig. 11. The neck molds 114 are adapted to cooperate alternately with the extrusion nozzle 56 and the blow molds 113 and their movements in this cooperative cycle are controlled by the valve 125 mounted upon table 112. Valve 125 is actuated by the stationary cam 155.

Valve 125 is provided with pressure air from main line 26 and an air line 120 leads from one end of the valve to the top of air motor 118. When the piston stem 126 of valve plunger 127 is free from the control of cam 155, a spring 128 holds it in the position shown in Fig. 8 and permits pressure air from line 26 to pass through line 120 and retain the piston 119 of air motor 118 in its down position with the neck mold 114 seated on table 112 as shown in Fig. 6.

As the mold table 112 rotates and approaches position B (Fig. 4), the piston stem 126 of valve 125 rides on cam 155 shifting the valve plunger 127 to permit air to pass through line 131 raising piston 119 of air motor 118 moving the neck mold 114 up into contact with the material extrusion nozzle 56. As the neck mold 114 approaches nozzle 56, the shear 85 moves to one side permitting the neck mold 114 to seat on the nozzle 56 and in alignment with orifice 63.

Concurrent with the contact between neck mold 114 and nozzle 56, the nozzle is locked to column 75 and rotates therewith to approximately the position shown in Fig. 3. With the contact between neck 114 and nozzle 56 the moldable material is filled into the neck mold 114 under pressure and after a short time interval in such position, the valve 125 is freed from control of cam 155 thus passing air to line 120 causing the piston 119 to move downward carrying the filled neck mold 114 away from the nozzle 56. During this withdrawal motion, the extrusion of the moldable plastic material in tubular form is continued as in Fig. 6, until the neck mold is again seated on table 112.

Figure 7:
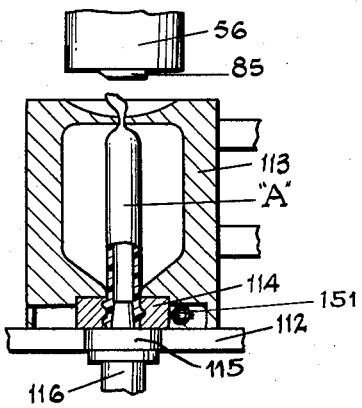
Fig. 7 is an enlarged elevational view showing the blow mold closed about the extruded tube and with the severing completed.

During this withdrawal action the blow molds 113 start to close under control of valve 125 and cam 35 and reaches full closed position immediately after the seating of the neck mold 114 on table 112 (see Fig. 7). Simultaneous with this mold closing the shear 85 is actuated to sever the tube and the nozzle 56 returns to line "B" through the actuation of air motor 100 and unlocking of lock blocks 72 and 76 from column 75.

With the closing of blow mold 113 the tubular member "A" is pinched between the mold halves, thus sealing one end of the tube. Air under pressure is then admitted through supply line 26ᵃ to valve 135 into tube 136 telescoped through piston rod 116 and thence through passage 137 to blow the tubular plastic member into a hollow article within the mold 113. The blowing air to tube 136 is controlled by valve 135 and cam 45 (see Figs. 1 and 6).

With the continued rotation of the table 112 the molds approach the position "D" (see Figs. 2 and 4) and the stem 36 of valve 130 rides off of the end 136 of cam 35 causing the motor 23 to operate to open the blow mold 113. Immediately after or concurrent with such blow mold opening, the roller 139 also rides off of the end 136 of the side wall 140 of cam 35, thus moving rack yoke 141 through the pressure of spring 142 to rotate arm 143 through gear 144. The arm 143 is so shaped at 145 that it spreads fingers 146 and 147 about the post 148 to open the halves of neck mold 114 a sufficient distance to permit the removal of the blown article. When roller 139 reaches the beginning of cam 35 as at 150, the roller 139 is moved outwardly swinging arm 143 about the post 148, thus releasing fingers 146 and 147. Spring 151 then closes the neck mold 114 and retains it closed.

The continuing rotation of table 112 brings successive molds 113 and 114 into operative relation to nozzle 56 and the above described operations are repeated in succession. In order to carry the forming cycle above described, it is necessary that certain structural features be provided in the plastic material extrusion mechanism as will be set forth hereinafter.

The plastic material extrusion head 11 is formed in two sections. One is a stationary section 50 attached to the extruder 10 and having its vertical axis parallel to and in alignment with the vertical axis of the molding machine 12. Section 50 has connected thereto a section 51 movable through a horizontal swivel bearing connection 52. Also provided in this extrusion head is a second swivel joint 55 which permits the vertical axis of the extrusion nozzle 56 to be suitably adjusted to bring its mold cooperating face 57 into a horizontal plane level with and matching the top surface of the molds 113.

Extending through the extrusion head 11 and adapted to conduct molding material therethrough is the usual material conduit. This conduit leads to an annular chamber 62 in the extrusion nozzle 56 where the material accumulates in annular form and from whence the plastic material is extruded in tubular form through the annular extrusion opening 63.

Locking plate 67 locks the members 52 and 51 together in such manner as to permit oscillating or rotary motion about the vertical axis of the head member 50.

Attached to one side of the head member 51 is a vertically disposed air motor 70 which carries on the lower end of its piston rod 71 a locking block 72.

Formed on the vertical center line of the molding machine table 12 is a hollow column member 75 adapted to hold pressure air supplied from column 15 and line 19. Attached to the top horizontal surface of member 75 is a series of locating blocks 76. These blocks are equally spaced about the circumference of the member 75 and have a specific circumferential position with respect to each mold 113. The location of each block 76 is such as to pick up the extrusion head 11 at the position "B" shown in Fig. 4, and to release same approximately at position "C" shown in Fig. 3.

Referring to Fig. 1, the piston 71 of air motor 70 is shown in retracted position but at this point it will be moved down into contact with its respective locking block 76. A cam 80 mounted on the motor drive shaft 18ᵃ is the operating control for valve 81 and moves the valve in a direction to supply air through line 77 to move the piston rod 71 of motor 70 downwardly bringing the block 72 into contact with one of the locking blocks 76. These blocks 76 are attached to the continuously rotating column 75 of the molding machine 12 as shown in Figs. 3 and 4, and rotate in a closed path. Due to the rotation of the column 75 the swivel section 51 of the extruder will be caused, by this contact between blocks 72 and 76, to move in unison with each mold 113 during the period of filling the neck mold 114 and the concurrent extrusion of tube length "A." In Fig. 5, the extrusion nozzle 56 and neck mold 114 are illustrated as in alignment and with neck mold 114 being retracted to its down position as in Fig. 6. When the center lines of neck mold 114 and the nozzle 56 coincide the lock 72 will contact the proper block 76 on the column 75 causing the nozzle and mold to be locked together and to move in aligned unison. At the time these mentioned parts reach the position shown in Fig. 6, the molds 113 are closed and simultaneously therewith, a shearing knife 85 is actuated to sever the tubular extrusion from the nozzle 56.

This shear 85 is actuated by an air motor 86 controlled by the two-way valve 87, said valve being actuated by a cam 88 mounted on a motor drive shaft 18ᵃ. Cam 88 is so contoured that the shearing knife 85 swings into shearing position to completely sever the tube and will then remain in shearing position as shown in Fig. 7 until just prior to contact between the next neck mold 114 and the nozzle 56. The operating air for piston motor 85 is carried from valve 87 through lines 90 and 91 and is provided from main line 19.

With the severance of the extrusion "A" from the nozzle 56, valve 81 is actuated to provide air through lines 95 and 96. The air passing through line 96 goes to the bottom end of cylinder 70 raising the locking block 72 from contact with block 76, thus releasing the extruder head 11 from the control of the rotating column 75. The air from line 95 goes to the end of the cylinder 100 which, through its piston rod 101 and a link connection 102 to the head 11, moves the head about the swivel 52 and returns it to the starting position as shown in Figs. 2 and 4.

In operation the table 12 rotates continuously in a clockwise direction, and as each mold 113 and 114 reaches a position approximately at line "B" (as shown in Figs. 2 and 4) the extrusion head 11 is locked in aligned relation with each neck mold 114 and its blow mold 113 by means of the locks 72. This causes the extrusion head to travel clockwise with each successive mold to produce a succession of tubular blanks or members "A" each having a finished molded neck portion formed thereon. These blanks are then blown to finished form while the next blank is being formed in the next succeeding mold unit.

This specification is a continuation-in-part of our co-pending application Serial No. 450,604, filed August 18, 1954, now Patent No. 2,858,564.

Modifications may be resorted to within the spirit and scope of the appended claims.

We claim:

1. In an apparatus for making hollow plastic articles, the combination comprising an annular series of forming mold units mounted for movement in a closed path, each said unit comprising a blow mold and a neck mold, a driving device arranged to continuously move said mold units in said closed path, an extrusion nozzle arranged to cooperate with each said mold unit in succession, a locking device arranged to lock each successive mold unit to said nozzle and move same along a portion of said closed path in registered alignment, a fluid operated device operable during said movement to bring the neck mold of each such unit into and out of registered physical contact with said nozzle, a pressure device operable during said mold contact to injection mold a neck formation for a plastic article and concurrently extrude an unconfined length of tubing integral with said neck formation, blow molds arranged to enclose said extruded tube during said nozzle movement, a shearing device arranged to sever said enclosed tube, a blow head operable subsequent to said nozzle and mold cooperation to expand the tube in said blow mold and a timing means operable to actuate said devices in synchronism.

2. An apparatus in accordance with claim 1 wherein said molds are mounted on a table for continuous movement in a closed circular path and wherein said nozzle movement is oscillatory in and along said circular path.

3. An apparatus in accordance with claim 1 wherein one portion of said nozzle movement is fluid actuated.

References Cited in the file of this patent

UNITED STATES PATENTS

| | | |
|---|---|---|
| 2,284,332 | McCann | May 26, 1942 |
| 2,288,454 | Hobson | June 30, 1942 |
| 2,562,523 | Brunet | July 31, 1951 |
| 2,674,006 | Bailey et al. | Apr. 6, 1954 |
| 2,710,987 | Sherman | June 21, 1955 |
| 2,715,751 | Weber | Aug. 23, 1955 |
| 2,804,654 | Sherman | Sept. 3, 1957 |

FOREIGN PATENTS

| | | |
|---|---|---|
| 697,326 | Great Britain | Sept. 23, 1953 |